United States Patent
Dedhia et al.

(10) Patent No.: US 7,165,068 B2
(45) Date of Patent: Jan. 16, 2007

(54) SYSTEM AND METHOD FOR ELECTRONIC CATALOG CLASSIFICATION USING A HYBRID OF RULE BASED AND STATISTICAL METHOD

(75) Inventors: Aatish Dedhia, Mumbai (IN); Palani Anandan, Mumbai (IN); Sunil Singhania, Mumbai (IN); Avik Sarkar, Mumbai (IN)

(73) Assignee: Zycus Infotech Pvt Ltd., Mumbai (IN)

( * ) Notice: Subject to any disclaimer, the term of this patent is extended or adjusted under 35 U.S.C. 154(b) by 222 days.

(21) Appl. No.: 10/188,370

(22) Filed: Jul. 3, 2002

(65) Prior Publication Data
US 2003/0233350 A1 Dec. 18, 2003

(30) Foreign Application Priority Data
Jun. 12, 2002 (IN) .................. 518/MUM/2002

(51) Int. Cl.
*G06F 17/30* (2006.01)
(52) U.S. Cl. ................ 707/7; 707/6; 707/100
(58) Field of Classification Search .......... 707/6, 707/102, 7, 100
See application file for complete search history.

(56) References Cited

U.S. PATENT DOCUMENTS

| | | | | |
|---|---|---|---|---|
| 5,963,940 | A * | 10/1999 | Liddy et al. | 707/5 |
| 6,006,221 | A * | 12/1999 | Liddy et al. | 707/5 |
| 6,029,195 | A * | 2/2000 | Herz | 725/116 |
| 6,192,360 | B1 | 2/2001 | Dumais et al. | |
| 6,233,575 | B1 | 5/2001 | Agrawal et al. | |
| 6,658,467 | B1 * | 12/2003 | Rice et al. | 709/224 |
| 6,714,925 | B1 * | 3/2004 | Barnhill et al. | 706/48 |
| 6,751,600 | B1 * | 6/2004 | Wolin | 706/12 |
| 6,778,986 | B1 * | 8/2004 | Stern et al. | 707/10 |
| 6,904,408 | B1 * | 6/2005 | McCarthy et al. | 705/2 |
| 2002/0103834 | A1 * | 8/2002 | Thompson et al. | 707/526 |
| 2003/0063779 | A1 * | 4/2003 | Wrigley | 382/116 |
| 2003/0172043 | A1 * | 9/2003 | Guyon et al. | 706/48 |
| 2003/0225526 | A1 * | 12/2003 | Golub et al. | 702/19 |
| 2003/0233350 | A1 * | 12/2003 | Dedhia et al. | 707/3 |
| 2005/0288954 | A1 * | 12/2005 | McCarthy et al. | 705/1 |

OTHER PUBLICATIONS

Galen, The Coming Explosion in Kosovo, The CATO Institiute, Mar. 2, 2001.*
Gilardi et al, Local Machine Learning Models for Spatial Data Analysis, Journal of Geographic INformation and Decision Analysis, vol. 4, No. 1, pp. 11-28.*

* cited by examiner

*Primary Examiner*—Frantz Coby
(74) *Attorney, Agent, or Firm*—Sidley Austin LLP (57) ABSTRACT

The present invention provides for a method and system for the classification of electronic catalogs. The method provided has a lot of user-configured features and also provides for constant interaction between the user and the system. The user can provide criteria for the classification of catalogs and subsequently manually check the classified catalogs.

34 Claims, 6 Drawing Sheets

SYSTEM AND METHOD FOR ELECTRONIC CATALOG CLASSIFICATION USING A HYBRID OF RULE BASED AND STATISTICAL METHOD

The present invention relates to the field of classification of electronic catalogs, into relevant categories in the category hierarchy. More particularly the invention is aimed towards providing a higher accuracy of catalog classification by providing a confidence value to the classification and subsequent manual checking of a sample of classified catalogs.

BACKGROUND

With the rapid spread of Internet, that has being growing exponentially since the last two decades every part of human life and the activities surrounding it are now done through the Internet. Similar is the case for business and online trading. Previously while buying and selling of items people used to browse through huge paperback catalogs containing thousands of records and then take a decision. In order to search for a product of interest the person concerned has to first find out from the index or content page, the probable topics/categories in which product with that description might occur. Then he has to browse through each of the entries of that page to find the product of his need. He has to repeat the procedure for new topics if he gets no satisfactory results.

For the ease of the user to search through catalogs more and more companies are reverting to electronic catalogs. The user can search through the catalogs quickly and hence place an order for the product immediately. This saves lot of time and money.

Today one can see every commodity of business or of daily life being available online on the Internet. One can buy food items of daily need online, and also medicines or machinery parts and even cars or bikes on the Internet. When a person goes for shopping in a real market he/she will find many different shops or outlets each selling different items. So the person can easily choose the shop of interest, go inside it and fetch the product of his/her need. Another scenario is that of a super market, where in one place a large variety of different products and stocked together. And the items here are arranged in accordance to its type. Like for example food items at one end, within it cereals in one section, vegetables in another and a different section for each food type.

Like wise if one is speaking of hardware machinery parts, there will be one section displaying nuts of various kinds, another displaying bolts of various kinds and so on. So when multiple items are stacked in the same place they are arranged in a form according to its type and category. Now comparing this case to that of an online store, here too the items need to be stored in different sections so as to distinguish from different items. But different items come from different sources and due to which they do not always contain the proper standardized categorization. Moreover the supplier simply gives information of the catalogs but does not provide any categorization for the same. But for this catalog to be of any use so that it can be put for display online there ought to be a category attached to it. Here at this point arises a need to have a system that can classify the catalogs into the relevant categories so that the catalogs can be put onto any further use or processing.

This is where catalog classification comes into play. Classifiers can be parametric or non-parametric. Two well-known classes of non-parametric classifiers are decision trees, and neural networks. For such classifiers, feature sets larger than 100 are considered extremely large. Document classification may require more than 50,000.

The most mature ideas in IR systems and text databases, which are also successfully integrated into commercial text search systems involve processing at a relatively syntactic level e.g. stopword filtering, tokenizing, stemming, building inverted indices, computing heuristic term weights, and computing similarity measures between documents and queries in the vector-space model. More recent work includes statistical modeling of documents, unsupervised clustering (where documents are not labeled with topics and the goal is to discover coherent clusters), supervised classification, query expansion. Singular value decomposition on the term-document matrix has been found to cluster semantically related documents together even if they do not share keywords.

Further the classification system might be rule based or machine learning based. In some instances, textual content must be classified with absolute certainty, based on certain accepted logic. A rule-based system may be used to effect such types of classification. Basically, rule-based systems use production rules of the form:

IF condition, THEN fact.

The conditions may include whether the textual information includes certain words or phrases, has a certain syntax, or has certain attributes. For example, if the textual content has the word "close", the phrase "nasdaq" and a number, then it is classified as "stock market" text.

Unfortunately, in many instances, rule-based systems become unwieldy, particularly in instances where the number of measured or input values (or features or characteristics) becomes large, logic for combining conditions or rules becomes complex, and/or the number of possible classes becomes large. Since textual information may have many features and complex semantics, these limitations of rule-based systems make them inappropriate for classifying text in all but the simplest applications.

Over the last decade or so, other types of classifiers have been used increasingly. Although these classifiers do not use static, predefined logic, as do rule-based classifiers, they have outperformed rule-based classifiers in many applications. Such classifiers typically include a learning element and a performance element. Such classifiers may include neural networks, Bayesian networks, and support vector machines.

Most of the present day document classification systems available classifies the document into the most relevant category. But in real life we often face situations where a document needs to be classified into more than one category. The importance for the same becomes more intense when one talks of catalog data. A certain product in a catalog may be a medical instrument for measuring blood pressure. So a doctor will try finding this product in the medical domain. A mechanical or electrical engineer manufacturing this product will look for this and similar products in the measuring instruments section. Likewise many other people from varying background may look for the similar product. But a major disadvantage of present day classification systems is that none of them allows the catalogs to be classified into more than one category.

The present day classification systems available are based on statistical machine learning techniques. These systems have to be trained with adequate training data to get good output from them. But even if a system is not properly trained it does not report the same but instead makes decisions on whatever training it has received. Hence whether these sytems do the classification task correctly or wrongly it does the same with full confidence and reveal nothing as to whether the training was inadequate or whether the classification task at hand very new and different to the learner. Hence in such cases where the data from the clasifier is directly put onto for online display it becomes very risky for the end user to completely rely on the classification task. Hence there arises a need for the user to provide him/her with a confidence value for each classification task. Hence based on this value the end user can decide whether to do a manual checking for the same or to use the classification result directly. And if such a confidence value is provided to the user then the user would like to classify items only with certain confidence and the rest the user can keep for manual classification, the system is not quite sure of the exact class into which it should be classified.

Often when the user is not quite sure of the classification process and wants to get an overall idea of how the classification has being performed, he/she is left with no other option other than to go through all the catalogs again and manually check each of them. This idea leads to a lot of wastage of time. And another thing is that if the user has to manually check all the catalogs then he/she may as well manually classify all of them rather than using any automatic classification software. Then the role of the software becomes completely redundant if the user has to manually recheck all the catalogs. In such a scenario it'll be very useful to the user if he/she is provided with only a very small set of the entire catalogs and by manually checking this small set of catalogs he/she will get a very good estimate of the overall accuracy.

The existing classification systems available are very rigid in their framework, i.e. it takes as input the document and returns the most relevant category as the output. In case the user is a very experienced one and wants to provide some information to help in better classification to the system, he/she is unable to do so because the system allows no interaction with the user. The user may have a rough idea of the product catalog by knowing the supplier from which the catalog has come. Now the user wishes to convey to the system the possible categories or possible segements in the hierarchy into which the catalog may lie. But in the present framework or the classification systems this is not a feature that is provided by any of them.

The existing classification systems classify the content into one of the leaf level categories of the category hierarchy. But there may exist cases where a catalog item is not quite appropriate for any of the child categories below a certain parent category and it'll be more appropriate if the catalog were classified at that non-leaf category instead of any of its child categories. But such functionality is not supported by any of the existing classification systems at present.

A classification system classifies the whole content by assigning equal weightage/importance to all the terms in the content. But there exists certain terms that are not much important for the catalog content. Whereas some other terms may be very deciding and based on these terms the system can decide the category into which this catalog should be classified. Hence such terms ought to be given more weightage than the other less important term. Hence some sort of feature selection procedure needs to be a very immediate requirement for any classification system. Such a feature selection procedure should ideally distinguish the more important terms in a catalog with respect to those of lesser importance. And hence based on this distinction it should assign different weightages to these terms, like giving more weightage to the more important terms as compared to those with lesser importance.

A variety of algorithms and methods are available for the task of text and catalog classification. On certain catalog data it has being observed that rule based methods give better results while on other catalog data sets statistical methods give far better results than those that are rule based. Hence an ideal classifier for the task of catalog classification will be a one that has all the good qualities of both rule based and statistical techniques. But among the present day classification systems available, these are either statistical or rule based but not one based on the combination of the both.

Usually catalogs come in more than one field like long description, short description, supplier name, dimensions etc. Now if a present day classification system is put onto to classify this particular catalog split in multiple fields, it will simply club all the information in a single field and send the same for classification. Now the user is aware of the fact that certain fields like supplier name and dimensions are of much lesser importance than those of the description fields. But the user is unable to convey this very valuable information to the system as it accepts all the information into one unified field. It'd be very convenient for the user if he/she can input the different information to the system in different fields and also assign some numerical value to each of these fields as a measure of importance of the field contents. For example the user may assign high weightage to the description fields as compared to the supplier or dimension fields.

The statistical model is built on the given input training catalogs. Now after the model is built the user may have a feeling that certain categories have not being adequately trained as compared to the classification data that he/she may receive. Hence the user may wish to tweak the computed values of some terms in certain categories. But none of the present day classification systems allow the user the flexibility to tweak or change the built training model. Hence an addition of such a feature will be very valuable and useful for the user working with it.

The statistical model once build on the basis of the training catalogs is either stored in the database or on flat files in most classification systems. And if new catalogs are added to the training data or if any of the existing catalogs are changed the user is left with no other option other than to delete the old model and build the new model in its place. This is too much of a time consuming procedure, as the system has to re-build the whole model from scratch and also repeat the process for the already processed catalogs. Hence a utility that takes care of the incremental building of the training model will be very useful and convenient for the user. By this if only a few catalogs are added or deleted, the system should to do the processing only for the newly added or deleted catalogs. Also if certain catalogs are changed, the system should carry on the processing only for the changed catalogs rather than for all the catalogs.

At times certain different categories may contain a similar kind of catalog data. But while training data is provided they are split up into many different categories. But if the training were done in such a category schema it'll make the training model quite weak. Also there may exist cases where certain categories in the hierarchy need to be mapped to a different category for better training and to strengthen the training model. Also a situation may arise in which the training catalogs has being provided in a given category hierarchy but after that the category hierarchy has changed and due to which the system needs to report the output of the classification task in another category hierarchy. But none of the present day available classification systems support this functionality. Hence the addition of such a functionality that allows the user to map the category hierarchy with another different hierarchy for internal classification will be very useful. Hence if such functionality were available based on this the user can do the classification on a different hierarchy and report the results in another hierarchy.

A user may have a need to classify catalogs from various languages, in which a single system could be trained to classify catalogs from various languages. But the present day classifiers are made specific to one particular language. Hence a classifier build for English language will not be able to classify catalgos in different language, say German or Japanese. This is due to the fact that the classifier made for English language will only understand English characters and can extract only English tokens. Hence such a system will not be able to fulfill the purpose the user is left with no other alternative rather than to use different classifiers for all the languages. This can have more difficulties, like each of them may require inputs in different formats; hence the user has to supply the input specific to the language. To tackle this multi-lingual issue the user has to bear lots of extra overheads of cost, time and resources. This is mainly due to the fact that no single present day classification system is able to handle classification in more than one language.

U.S. Pat. No. 6,223,575 describes a multilevel taxonomy based on features derived from training documents classification using fisher values as discrimination values. This patent uses tokens from the catalog rapidly build and update the classification models. The hierarchical model built helps in efficient context sensitive classification. But the drawback here is that a user can not know the efficiency of the classification achieved by the system.

U.S. Pat. No. 6,192,360 describes a text classifier and building the text classifier by determining appropriate parameters for the text classifier. Though this patent describes an efficient method for parameter extraction through training catalogs but is inefficient in the classification phase and the subsequent testing phase.

Another drawback with both the above classifiers is that they are essentially for document classification and do not tackle the issues specific for catalog classification.

OBJECTS AND SUMMARY OF THE INVENTION

The present invention is that of a catalog classification system with many added functionalities. As compared to all the present day classification systems, the invention has lots of configurable features, which the user may change and configure according to need. This classification system is designed specially for the task of catalog classification.

First object of the invention is to allow classification of product catalogs into more than one category when the system feels that one category is not adequate to describe the catalog. This is a configurable feature and the user may configure it to display only the top most relevant number of categories the user wants to view.

The second object of the invention is to attach a confidence value with each catalog classified.

Next objective of the invention is to provide reliable quality assurance of the classification of a set of catalogs.

Further the objective of the invention is to provide user-system interaction. It allows the user to choose certain portions of the category hierarchy and based on this the system classifies the catalog into the categories in the selected portions.

The next objective of the invention is to allow classification of catalogs at non-leaf level categories if the system is not quite sure of the exact leaf level categories below it to which the catalog should be assigned.

Further objective of the invention is to provide a method of feature selection. Based on the pre-calculated information gain values in the training phase the terms in the catalog under classification are sorted.

The present invention uses a hybrid of rule based and statistical techniques for the task of classification. The user has the option of choosing as to whether he/she wants any rules to be applied on the data for classification. If so then rules are applied and the system tries to classify the catalogs based on the supplied rules. If the rules cannot correctly classify the catalog then the system applies the statistical methods on it to classify it.

It is also an objective of the invention to allow the user to enter a catalog for classification in multiple fields. This functionality is provided to the user because the catalog contains much information some of which directly affects the classification whereas others don't. So when the user enters the catalog in different fields the user can tell the system to deal with each of them differently. The user also has the option of assigning different weightages to each of these fields. For example the user may assign high weightage to the description fields of the catalog as compared to the supplier or dimension fields, which are not that important.

The present invention allows the user to tweak the model build on the training examples by the system. Often the user may have a feeling that the training catalogs are not quite adequate for proper training of the system. Hence after the training is complete the user can assign external weightages to the terms in the categories. By this the user can externally change the model that has being built in the training phase.

The present invention allows the rapid updating of the training model. When some new catalogs are added to the system or deleted from the system, the system only does the processing for the new or deleted catalogs and hence saving a lot of time on the model rebuilt process. Also if a few catalogs were changed then the system is so made that it only needs to do the processing for the changed catalogs and the rest of the training can be as it was.

The present invention allows the user to do the internal training based on a different category hierarchy and reports the end result to the user based on a different category hierarchy. This is a very important and useful feature for the user. The training may have being done in a given category hierarchy, but after that the hierarchy has changed and due to which no proper training data exists for the new hierarchy. So the user may just have to map the old hierarchy to the new one by which he/she can use the huge knowledge base that has being captured in the training phase.

The present invention provides the facility for classification of catalogs from all the languages. Hence the present system takes in catalogs for training along with the language to which the catalog belongs. It is developed in such a manner that it can tokenize the inputs from that specific language and build a training model accordingly. During the classification phase also the system takes as input a particular catalog and the language to which it belongs and classifies the system in the appropriate language. Hence with this present invention the user will not require a different classifier for each language but do the classification in multiple languages using the present invention.

To achieve the said objectives the invention provides for a method system and program product for training the catalog classification system and then classify the catalog using a combination of rule base and statistical techniques. Functionality of checking the classification is also provided after an efficient sampling of the trained catalogs has been done by the system. The user can assign external weightage to the terms and fields used for the classification. Further the classification in multiple languages is also possible.

DETAILED DESCRIPTION OF THE FIGURES

Figure 1:
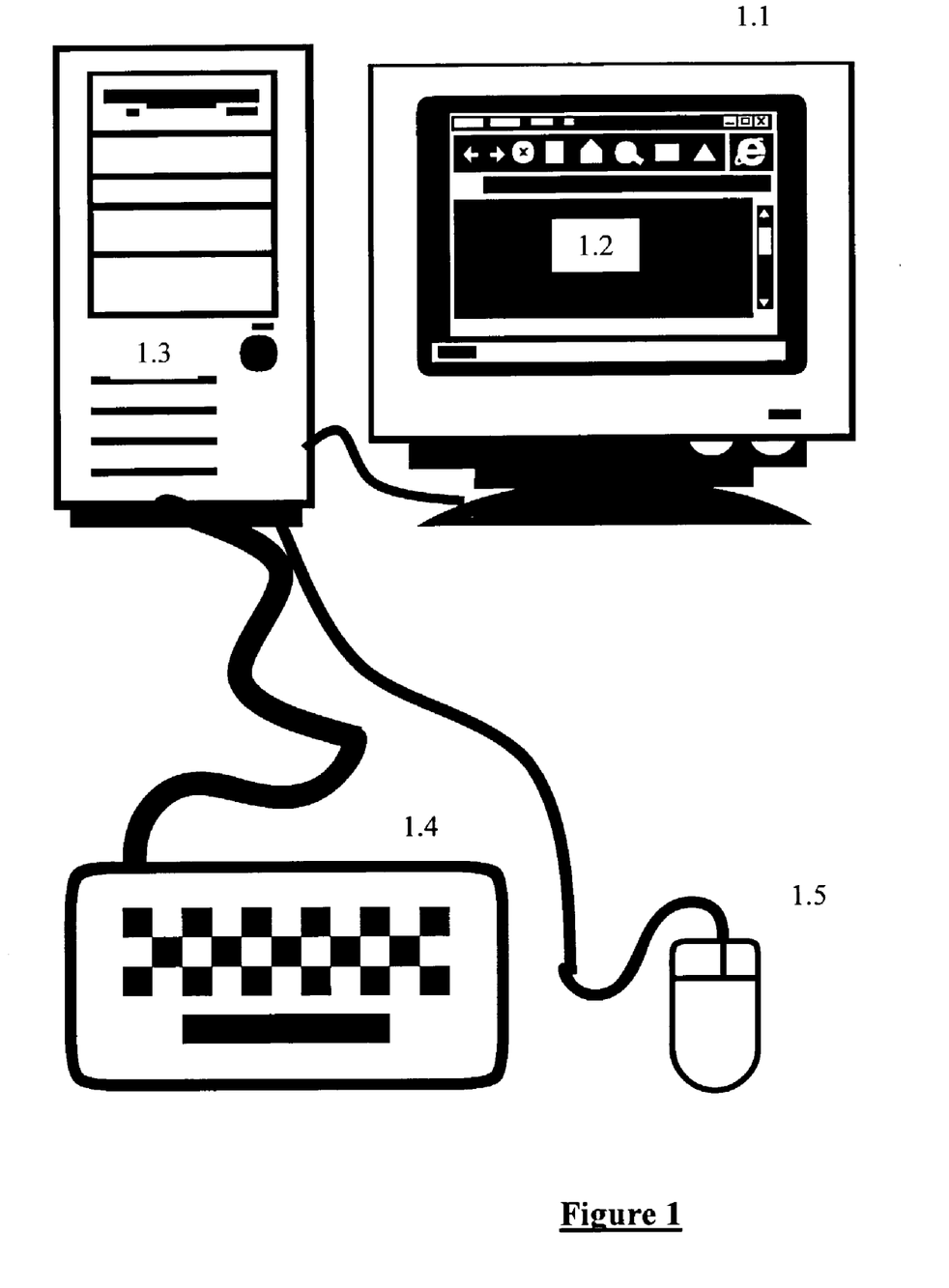
FIG. 1 shows a basic computing system on which the invention can be practiced.

FIG. 1 shows a basic computer system on which the invention might be practiced. The computer system comprises of a display device (1.1) with a display screen (1.2). Examples of display device are Cathode Ray Tube (CRT) devices, Liquid Crystal Display (LCD) Devices etc. The computer system can also have other additional output devices like a printer. The cabinet (1.3) houses the additional essential components of the computer system such as the microprocessor, memory and disk drives. In a general computer system the microprocessor is any commercially available processor of which x86 processors from Intel and 680X0 series from Motorola are examples. Many other microprocessors are available. The computer system could be a single processor system or may use two or more processors on a single system or over a network. The microprocessor for its functioning uses a volatile memory that is a random access memory such as dynamic random access memory (DRAM) or static memory (SRAM). The disk drives are the permanent storage medium used by the computer system. This permanent storage could be a magnetic disk, a flash memory and a tape. This storage could be removable like a floppy disk or permanent such as a hard disk. Besides this the cabinet (1.3) can also house other additional components like a Compact Disc Read Only Memory (CD-ROM) drive, sound card, video card etc. The computer system also has various input devices like a keyboard (1.4) and a mouse (1.5). The keyboard and the mouse are connected to the computer system through wired or wireless links. The mouse (1.5) could be a two-button mouse, three-button mouse or a scroll mouse. Besides the said input devices there could be other input devices like a light pen, a track ball etc. The microprocessor executes a program called the operating system for the basic functioning of the computer system. The examples of operating systems are UNIX, WINDOWS and DOS. These operating systems allocate the computer system resources to various programs and help the users to interact with the system. It should be understood that the invention is not limited to any particular hardware comprising the computer system or the software running on it.

Figure 2:
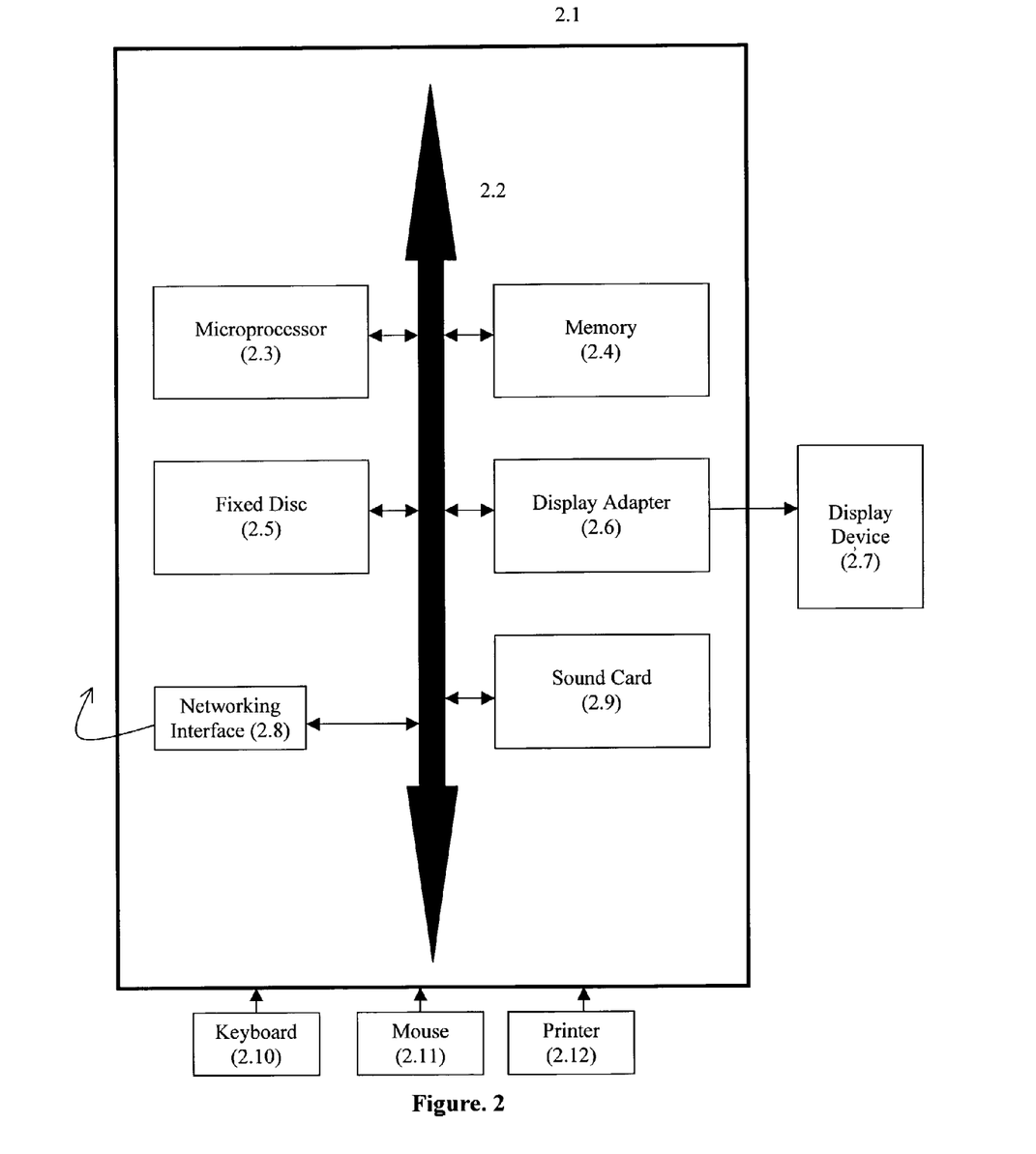
FIG. 2 shows the internal structure of the computing system of FIG. 1.

FIG. 2 shows the internal structure of the general computer system of FIG. 1. The computer system (2.1) consists of various subsystems interconnected with the help of a system bus (2.2). The microprocessor (2.3) communicates and controls the functioning of other subsystems. Memory (2.4) helps the microprocessor in its functioning by storing instructions and data during its execution. Fixed Drive (2.5) is used to hold the data and instructions permanent in nature like the operating system and other programs. Display adapter (2.6) is used as an interface between the system bus and the display device (2.7), which is generally a monitor. The network interface (2.8) is used to connect the computer with other computers on a network through wired or wireless means. The computer system might also contain a sound card (2.9). The system is connected to various input devices like keyboard (2.10) and mouse (2.11) and output devices like printer (2.12). Various configurations of these subsystems are possible. It should also be noted that a system implementing the present invention might use less or more number of the subsystems than described above.

Figure 3:
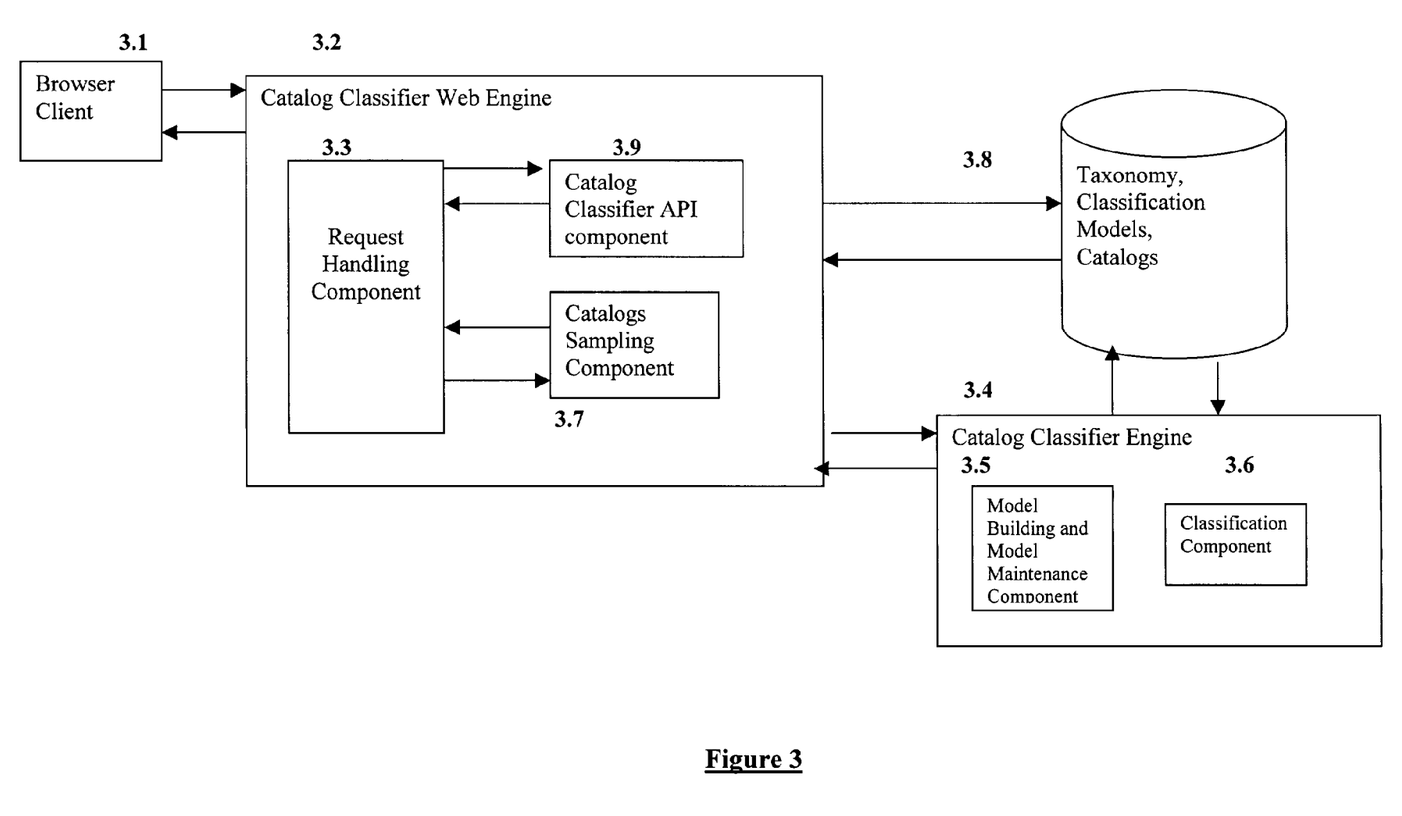
FIG. 3 is the functional block diagram of the invention explaining different modules that collectively achieve the desired functionality of classification of electronic catalogs.

FIG. 3 is the functional block diagram of the invention explaining different modules that collectively achieve the desired functionality of classification of electronic catalogs. It is a block diagram of the automatic catalog classifier with many different functionality and configurable features. 3.1 is the client browser through which the user sends in the request for training of the system or for the classification of catalogs. The control is handed over to the Catalog Classifier's Web Engine (3.2). 3.4 is the request handling module for handling various requests. The Catalog Classifier's Web Engine (3.2) may forward the request to the Catalog Classifier Engine (3.4), which then forwards the request, based on its type. If the request sent is for the building or model maintenance then it is sent to Model Building & Model Maintenance Component (3.5). If the request is for classification then the control is handed to Classification Component (3.6), which classifies the catalogs. If the Catalog Classifier Web Engine (3.2) receives a request is that for sampling of the catalogs then the request is sent to Catalogs Sampling Component (3.7). The functionality for the upload and export/import of data and catalogs between the user and the database/s (3.8) is handled by an API component (3.9) that is present in the Catalog Classifier Web Engine.

Figure 4:
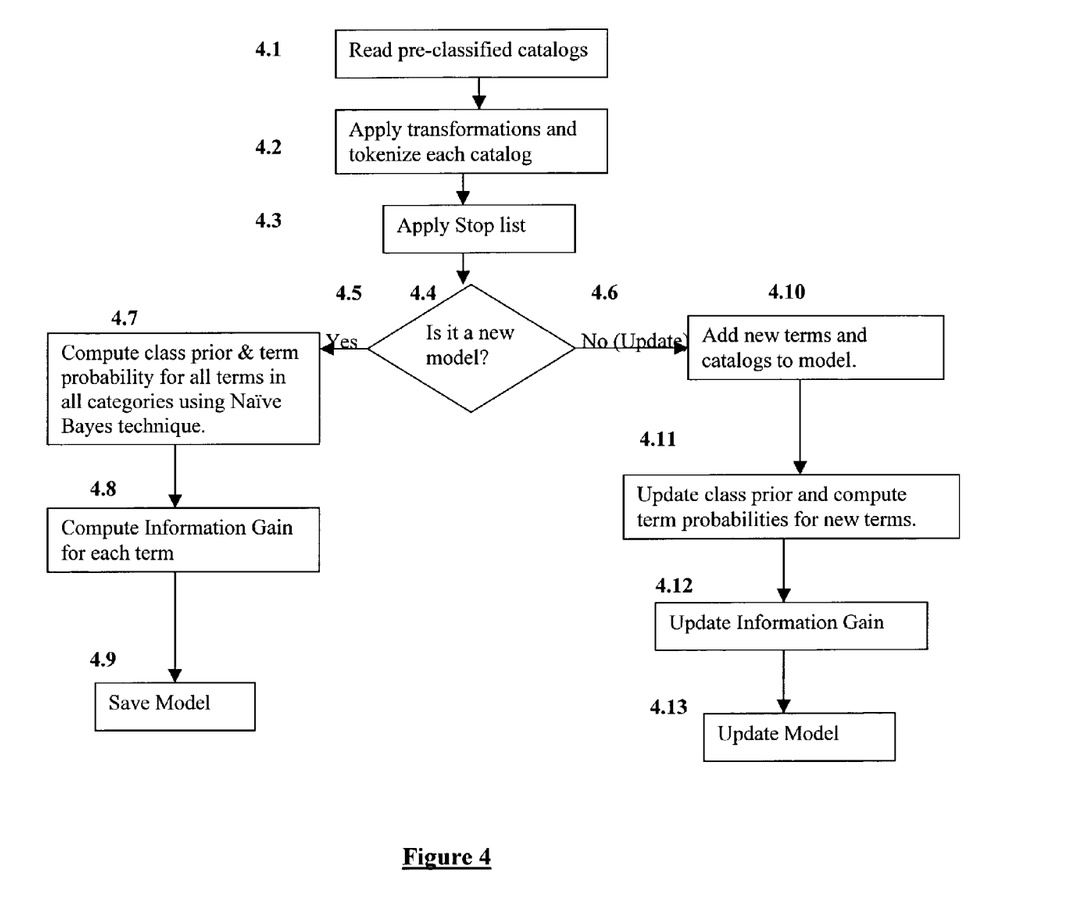
FIG. 4 is a flowchart for the functioning of model building and model maintenance component of FIG. 3.

FIG. 4 is a flowchart for the functioning of "model building and model maintenance component" of FIG. 3. This module is responsible for model building and model updating. The process starts with reading the pre-classified catalog data (4.1). This step takes place irrespective of whether the activity is of model building or model updating. Then the transformations are applied on the catalogs and they are tokenized into individual terms (4.2). A stop list is applied to the extracted tokenized terms in the next step (4.3) and only those terms that are not a part of the stop list are considered after this step. All the other terms are considered to be noise/junk terms and hence are dropped. The next step (4.4) checks whether the request is for the building of a new model or for a model updating. If the request is for building a new model (4.5) then all the training statistics like category prior (which is the probability of any particular catalog coming from that category) are calculated (4.7). All these calculations are based on the Naïve Bayes techniques. This step also calculates the prior probability of each of the terms occurring in the categories. In the next step the information gain for all the terms present in the entire vocabulary is calculated (4.8). This information gain provides a measure of importance of the terms in the corpus. This value of information gain is later used in the classification stage for the purpose of feature selection. The final step (4.9) saves the model in the format specified by the user. The available formats are those of saving it in a relational database, or in a flat file or in the XML format.

If on the other hand the request send is for a model updating (4.6) then the next step is of adding the new terms to the existing models, by extracting the terms from the new catalogs (4.10). This step also handles the deletion of any catalog and also the changes in any catalog. Next step (4.11) updates the category priors and term probabilities for the existing terms and categories and also computes the term probabilities for the new terms and category priors for the newly added categories. After this the information gain values for all the terms in the vocabulary are updated (4.12). Finally (4.13) the model is updated and saved in any of the user given formats as specified above.

Figure 5:
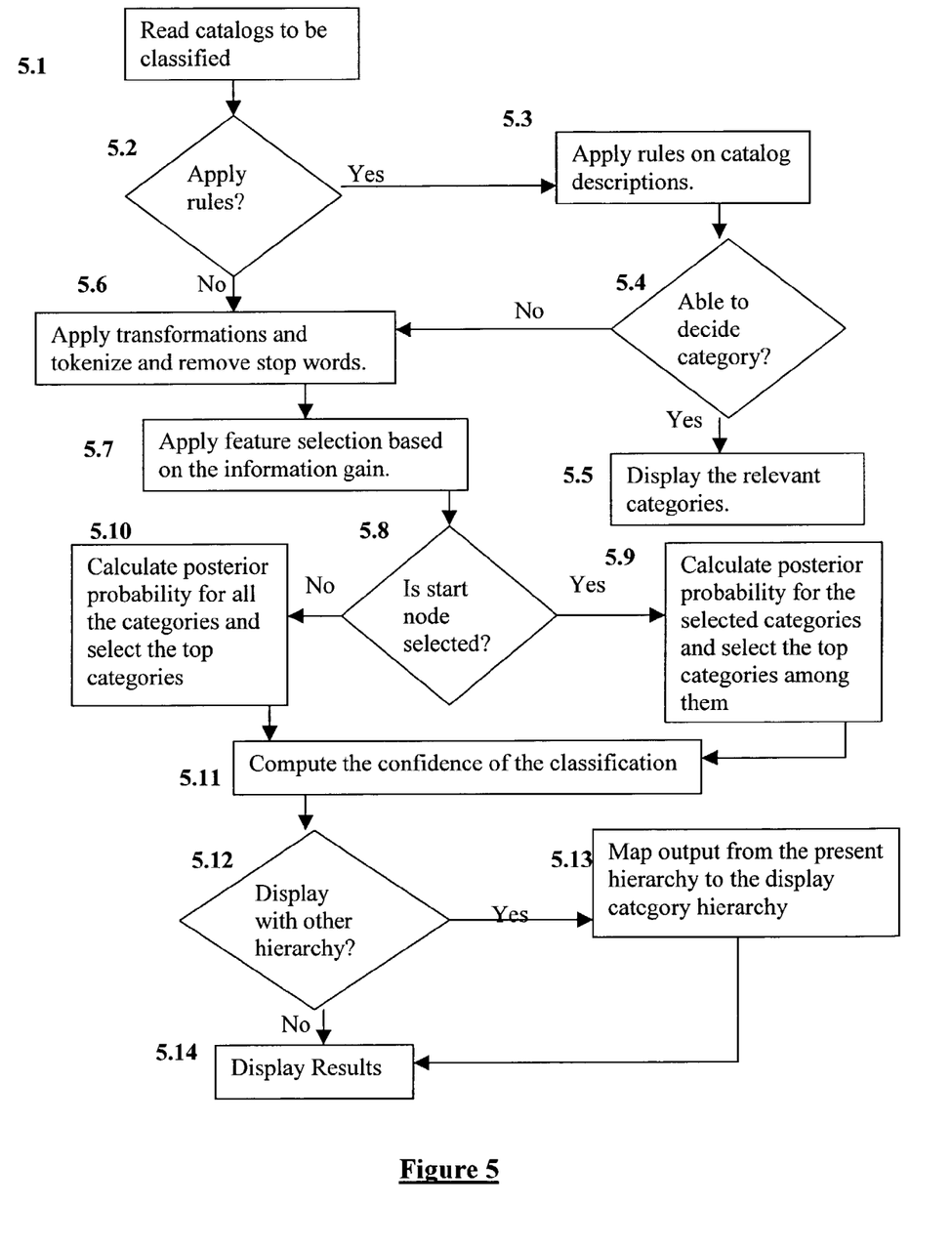
FIG. 5 is a flowchart for he classification component of FIG. 3.

FIG. 5 is a flowchart for the classification component of FIG. 3. This component is responsible for the classification of the unclassified catalogs. In the first step (5.1) the catalogs to be classified are read. It is then checked (5.2) whether rules have to be applied for these catalog classification task. If so then the next step applies the rules (5.3) on the catalog descriptions and tries to classify them based on the specified rules. If it is able to decide (5.4) the category based on these rules then the categories are displayed (5.5) and the process come to an end. Otherwise the control is transferred back to the step (5.6) that applies the transformations on the catalogs and tokenizes it into the individual terms. This step also takes place if in step 5.2 it is determined that rules are not to be applied for the classification of components. This section also removes the stop words or the noise words from the tokenized terms. In the next step (5.7) the feature selection procedure is applied on the tokenized terms. Here the terms are ranked in accordance to the pre-calculated information gain values. Based on this a soft partition is determined and terms above this soft partition are considered as important and those below it are considered unimportant. The next step (5.8) checks whether the user has selected certain portions of the hierarchy within which the classification has to be performed. If yes then the next step (5.9) involves computing the posterior probability for the selected categories and the top relevant categories are returned. If no, then the next step (5.10) involves computing the posterior probability for all the categories and return the top most relevant categories. The next step in both the cases is to pass the control to the "Posterior Probability Calculation Component" which is described in FIG. 6. The next step (5.11) computes the confidence value for the classification process. This value is a measure of the degree of confidence that the system has on the classification it has performed. This is a purely statistical measure based on what the system had being trained and how much the catalog under classification differs from those in the training phase. If there is a large deviation the system assigns less confidence value for that certain classification and otherwise. Now once this confidence value is available to the user, the user can configure the sytem to classify catalogs in a specified confidence range and catalogs that have the classification confidence value outside that range are marked as unclassified by the system. By this the user has total control on the classification process and can accordingly process the classified records. The user may & this stage configure the range within which he/she wants the catalogs to be classified. Catalogs that have confidence values outside that range are then termed as unclassified by the system. The next step (5.12) checks as to whether the output of the classification has to be reported on the same category hierarchy or any different hierarchy. If the reporting has to be done on a different category hierarchy (5.13) then the two hierarchies are mapped and the result is displayed (5.14) else the result is directly sent for display and the process comes to an end.

In the classification phase when a document comes for classification, in order to determine the class/category to which it may belong, first the terms are extracted from that document along with their frequencies. Then the posterior probability or the likelihood of this document is calculated for each of the classes or categories. Similarly the likelihood for all the classes are calculated and they are sorted in the descending order and either the topmost class is returned or the top few classes are returned as specified.

One can also calculate the relative probability or relative confidence value at this stage itself.

Figure 6:
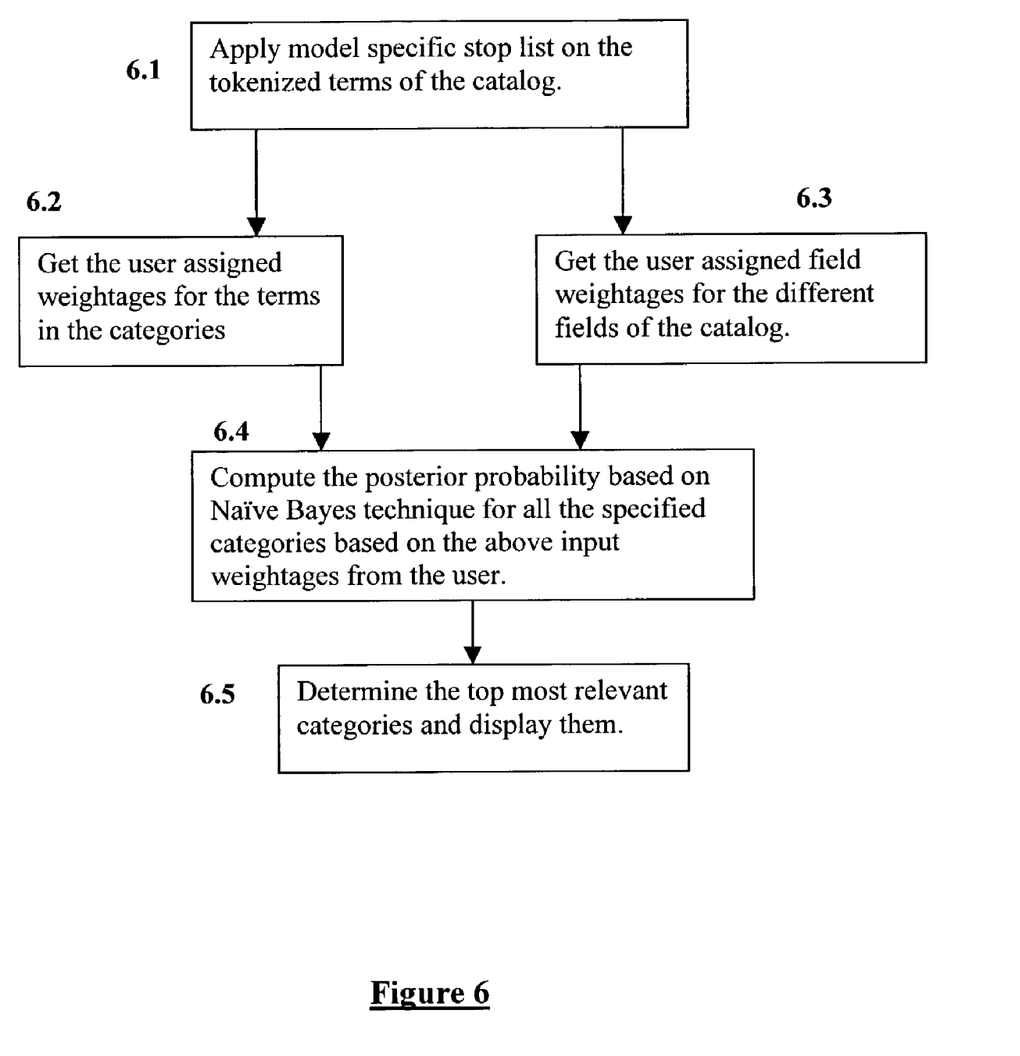
FIG. 6 describes the functionality of Posterior Probability Calculation Component of FIG. 5.

FIG. 6 describes the functionality of Posterior Probability Calculation Component of FIG. 5. This component applies the model specific stop list to the tokenized terms (6.1). It then takes in the user assigned weightages for the terms (6.2), which were assigned, by the user in the tweaking stage after the model building. It also takes in the different weightages for the different catalog fields (6.3). Based on these weightages and the Naïve Bayes technique the posterior probability for all the input categories are computed in the next step (6.4). Then these categories are sorted on the basis of the posterior values and the top most relevant categories are returned to the user (6.5).

After the classification stage the user might want to check for the accuracy of the classification. This is done through the method of random multi-stage document sampling. In a classification run; the classifier gets documents of varying variety, as a result of which the accurcay of the classifier for that data set will be different from another. But we are not aware of the actual category by the document should belong to. Hence it is not possible to find the classification accuracy automatically. Due to this reason, a manual intervention is required, who will manually check the classification results. But manual intervention is a very costly and time-consuming matter. Hence the aim is to choose documents judiciously so that the manual intervention can be reduced and at the same time we are able to achieve an accuracy value very close the actual value. Actual value is that accuracy figure that we would have obtained if all the documents in collection were manually checked.

When performing a sampling operation, the first thing that comes to mind is random sampling. Assume a scenario in which there is a class with 3 sections (A, B, C) and one has to estimate the performance of that class. Choosing some students at random from the whole set of students from the 3 classes may lead to many students from a certain section only and then the estimate will be biased towards that section. Therefore we select number of students proportional to the total number from that section. Even after doing this, when choosing randomly we may choose only students with good marks only, and due to this the estimate of the performance will be more than the original number. So what can be done is, divide each of the sections into groups of students based on their marks, and choose number of students from each group proportional to the weight of that group. The conclusion is that when doing a random sampling, the population from which one does the random sample should be as homogeneous as possible.

The above sated method of judiciously choosing samples as each level or stage is called MULTI-STAGE Sampling.

In the catalog classification case there are three stages for a Classification Run, namely and based on these sampling of catalogs is done for manual quality assurance:

Category returned by classifier

Unique Patterns of documents in that Category

Classifier's confidence value for documents in that particular class and pattern To allow training of catalogs from multiple languages, in which the training is done catalog should be tagged with the language to which it belongs. Similarly, while classification the user has to provide along with the catalog, the language to which it belongs and based on it the system does the classification for that language.

Having now described a few embodiments of the invention, it should be apparent to those skilled in the art that the foregoing is merely illustrative and not limiting, having been presented by way of example only. It will be apparent to those of skill in the appertaining arts that various modifications can be made within the scope of the above invention. Accordingly, this invention is not to be considered limited to the specific examples chosen for purposes of disclosure, but rather to cover all changes and modifications, which do not constitute departures from the permissible scope of the present invention. The invention is therefore not limited by the description contained herein or by the drawings, but only by the claims.

We claim:

1. A method for classification of electronic catalog entries at any level into one or more categories, comprising the steps of:
   training the catalog classification system in at least one language with the help of pre-classified training catalogs,
   classifying the said catalog entry into top most relevant categories in the said category hierarchy,
   assigning a confidence value to each of the said classified catalog entry, wherein a user of said method can configure the method to classify said catalog in a specified confidence range, and
   automated sampling of the said classified catalogs for quality assurance.

2. A method for classification of electronic catalog entries as claimed in claim 1 wherein said training step comprises of:
   extracting the catalog entry terms from each of the said pre-classified training catalogs in all the categories, and
   calculating and storing the external weightage of the said terms for all the categories in the hierarchy.

3. A method for classification of electronic catalog entries as claimed in claim 2 wherein terms are ranked in accordance to their importance followed by sorting of said ranked terms.

4. A method as claimed in claim 3 wherein terms in said catalog entry are ranked according to relative importance according to a pre-calculated information gain value, wherein terms having maximum difference in said rank value are detected as important or unimportant and separated in two categories based on importance thereby resulting in soft partition between the separated terms.

5. A method for classification of electronic catalog entries as claimed in claim 4 wherein terms on either side of said soft partition are assigned two different internal weightage for feature selection, with terms having larger weight being classified as favorable and the others as unfavorable.

6. A method for classification of electronic catalog entries as claimed in claim 1 wherein the classification step uses a combination of statistical and rule based techniques.

7. A method for classification of electronic catalog entries as claimed in claim 1 wherein the classification step allows the user to manually select certain portions of the category hierarchy in which to classify a catalog.

8. A method for classification of electronic catalog entries as claimed in claim 1 wherein one or more fields could be used to classify said catalog entries and users can assign external weightage to each of these fields.

9. A method for classification of electronic catalog entries as claimed in claim 1 wherein step to assign a confidence value to each of the classified catalog entry, uses statistical and machine learning techniques.

10. A method for classification of electronic catalog entries as claimed in claim 1 wherein the user can determine a catalog as classified if its within a user-specified confidence value range else mark it as unclassified.

11. A method for classification of electronic catalog entries as claimed in claim 1 wherein a catalog can be classified at non-leaf intermediate level category of the category hierarchy.

12. A method for classification of electronic catalog entries as claimed in claim 1 wherein said automated sampling is based on multi-stage random weighted sampling.

13. A method for classification of electronic catalog entries as claimed in claim 1 wherein said quality assurance is achieved by manual checking of sampled catalogs.

14. A method for classification of electronic catalog entries as claimed in claim 1 wherein the user can incrementally rebuild or update the model based on the addition and updating of said catalog entries.

15. A method for classification of electronic catalog entries as claimed in claim 1 further comprising the step of reporting full or partial results of classification to a separate internally mapped category hierarchy.

16. A method for classification of electronic catalog entries as claimed in claim 1 wherein for classifying a catalog into different languages, user has to specify the language along with the catalog entry.

17. A method as claimed in claim 1 wherein said method is a single step classifier.

18. A method for classification of electronic catalog entries at any level into one or more categories, comprising:
   training component to train the catalog classification system in at least one language with the help of pre-classified training catalogs,
   classifying component to classify the said catalog entry into top most relevant categories in the said category hierarchy,
   means to assign a confidence value to each of the said classified catalog entry, wherein a user of said method can configure the method to classify said catalog in a specified confidence range, and
   automated sampling component for quality assurance of the said classified catalogs.

19. A system of classification of electronic catalog entries as claimed in claim 18 wherein said training component comprises of:
   means to extracting the catalog entry terms from each of the said pre-classified training catalogs in all the categories, and
   means for calculating and storing the external weightage of the said terms for all the categories in the hierarchy.

20. A system for classification of electronic catalog entries as claimed in claim 19 comprising of means for ranking the terms in accordance to their importance followed by sorting of said ranked terms.

21. A system as claimed in claim 20 wherein means are provided such that terms in the catalog entry are ranked according to relative importance according to a pre-calculated information gain value, wherein terms having maximum difference in said rank value are detected as important or unimportant and separated in two categories based on importance thereby resulting in soft partition between the separated terms.

22. A system for classification of electronic catalog entries as claimed in claim 21 wherein soft partitioning means assign terms on either side of said soft partition, two different internal weightage for feature selection, with terms having larger weight being classified as favorable and the others as unfavorable.

23. A system for classification of electronic catalog entries as claimed in claim 18 wherein the classification component uses a combination of statistical and rule based techniques.

24. A system for classification of electronic catalog entries as claimed in claim 18 wherein the classification component comprises of means for the user to manually select certain portions of the category hierarchy in which to classify a catalog.

25. A system for classification of electronic catalog entries as claimed in claim 18 wherein classification component uses one or more fields to classify a catalog and comprises of means for users to assign external weightage to each of these fields.

26. A system for classification of electronic catalog entries as claimed in claim 18 wherein means to assign a confidence value to each of the classified catalog entry, uses statistical and machine learning techniques.

27. A system for classification of electronic catalog entries as claimed in claim 18 wherein the classification component has means for the user to determine a catalog as classified if its within a user specified confidence value range else mark it as unclassified.

28. A system for classification of electronic catalog entries as claimed in claim 18 wherein classifying component can classify a catalog at non-leaf intermediate level category of the category hierarchy.

29. A system for classification of electronic catalog entries as claimed in claim 18 wherein said automated sampling component uses multi-stage random weighted sampling.

30. A system for classification of electronic catalog entries as claimed in claim 18 wherein said quality assurance is achieved by manual checking of sampled catalogs.

31. A system for classification of electronic catalog entries as claimed in claim 18 comprising of means to incrementally rebuild or update the model based on the addition and updating of said catalog entries.

32. A system for classification of electronic catalog entries as claimed in claim 18 further comprising of means to report full or partial results of classification to a separate internally mapped category hierarchy.

33. A system for classification of electronic catalog entries as claimed in claim 18 wherein means to classify a catalog into different languages require a user to specify the language along with the catalog entry.

34. A method as claimed in claim 18 wherein said method is a single step classifier.

* * * * *